Jan. 27, 1970  F. E. FAUTH  3,491,873
SANITARY CONVEYOR CONSTRUCTION AND GUIDE RAIL
Filed Aug. 28, 1967  3 Sheets-Sheet 1

INVENTOR,
FREDERICK E. FAUTH

BY Jacobi & Davidson

ATTORNEYS

Jan. 27, 1970  F. E. FAUTH  3,491,873
SANITARY CONVEYOR CONSTRUCTION AND GUIDE RAIL
Filed Aug. 28, 1967  3 Sheets-Sheet 2

INVENTOR,
FREDERICK E. FAUTH
BY Jacobi + Davidson
ATTORNEYS

United States Patent Office 3,491,873
Patented Jan. 27, 1970

3,491,873
SANITARY CONVEYOR CONSTRUCTION AND GUIDE RAIL
Frederick E. Fauth, Baltimore, Md., assignor to American Bottlers Equipment Company, Baltimore, Md., a corporation of Maryland
Filed Aug. 28, 1967, Ser. No. 663,695
Int. Cl. B65g 15/60
U.S. Cl. 198—204   17 Claims

ABSTRACT OF THE DISCLOSURE

A guide rail for a container conveyor, the guide rail comprising an elongated rigid rail having an external surface area provided with indentations therein. Facing means of resilient material are provided to cover at least a portion of the external surface area of the rigid rail, the facing means being adapted to frictionally engage with the indentations in said external surface area. The guide rail is particularly adapted for use above either side of a conveyor means of a sanitary transfer mechanism. The transfer mechanism includes a pair of spaced apart confronting sidewall means extending downwardly beneath the conveyor means to either side thereof such that the conveyor means is exposed to facilitate cleaning. Drainage from the cleaning runs down the confronting sidewall surfaces into a drainage trough.

BACKGROUND OF THE INVENTION

This invention generally relates to transfer mechanisms and specifically relates to a sanitary transfer mechanism or conveyor for transporting containers and guide rails therefor.

Transfer or conveying mechanisms have long been utilized in various industries to transport articles from one location to another during processing with varying degrees of success. However, prior art transfer or conveyor mechanisms utilized in the environments of the food, dairy, brewing, and soft drink industries and the like have not been entirely satisfactory. Such industries must necessarily maintain rigid standards pertaining to cleanliness and other health considerations. Accordingly, machinery utilized in such industries must be constructed in a manner consistent with these standards. Naturally, a primary design consideration for such transfer mechanisms or conveyors utilized in food-related industries is that they be easy to clean thus facilitating the maintenance of a low bacterial count in the processing operation.

Yet, prior art transfer or conveying mechanisms fail to offer such a construction specifically designed to facilitate the cleaning operation. To the contrary, prior art conveyor constructions are generally such that dirt, spilled contents from food containers and the like can easily accumulate in the conveying mechanism itself, such accumulations providing ideal locations for the growth of harmful bacteria. Additionally, prior art transfer or conveying mechanisms literally have to be dismantled to effect a thorough cleaning of accumulated wastes particularly found on and under the conveyor chain or belt.

Another important difficulty encountered in prior art transfer conveying mechanisms relates to container damage caused during operation. Transfer or conveyor mechanisms must be constructed such that containers transported upon the conveying means, which may be a chain or belt, are restrained to movement only in the direction of conveyor or normal movement. Therefore, it has been a common practice to utilize guide members such as rails disposed above and to either side of the actual conveying means. Such guide members, while restraining the undesired lateral or transverse movement of containers upon the conveyor mechanism, are capable of causing considerable damage such as deep scratches or gouges to the containers rendering same unacceptable for further use. Additionally, slivers and small pieces of container material dislodged by the guide members could render unsanitary the entire processing operation. Thus, prior art guide member designs have generally not been very successful.

Accordingly, there still exists a need for a transfer mechanism or conveyor that is of sanitary construction offering ease of cleaning and having container guide members harmless to the containers being conveyed. It is a primary object of the instant invention to satisfy this need. Other and more detailed objects of the instant invention are as follows:

(a) The provisions of a sanitary transfer mechanism or conveyor in which all parts are exposed to facilitate cleaning;

(b) The provision of a sanitary transfer mechanism or conveyor constructed such that expended cleaning materials are drained and carried away;

(c) The provision of a sanitary transfer mechanism or conveyor utilizing material that will not support bacteria growth;

(d) The provision of a sanitary transfer mechanism or conveyor having guide members restraining undesired transverse container movement yet presenting non-scuff surfaces to the sides of containers being conveyed; and (e) The provision of easily replaceable guide members for use with conveyors of existing design.

SUMMARY OF THE INVENTION

The instant invention is thought to solve the problems associated with prior art conveyor devices and to satisfy the above objects in that a sanitary transfer mechanism for transporting containers is provided, the transfer mechanism utilizing an "endless" conveyor means disposed above a pair of downwardly directed, spaced apart confronting sidewall members to form an internal drainage and cleaning compartment. Support means are provided for maintaining the conveyor means disposed in a position above the sidewall members, the support means comprising a pair of spacer blocks having a phenolic compressed wood surface. The construction of the conveyor means and downwardly extending sidewall members is such that the transfer mechanism is practically totally exposed thus greatly facilitating cleaning by means of pressurized sprays and the like. The placement and shape of the sidewalls beneath the conveyor means allows water or other chemicals utilized in a cleaning operation to completely drain from the conveyor means into a trough provided beneath same. The trough, in addition to serving as a drain for the expended cleaning liquid, also serves to provide a return path for the conveyor means. Thus, the conveyor means returning through the trough will remove any flushed solid waste particles as well as the expended cleaning liquid. The sidewalls and trough are preferably constructed of stainless steel material to thus present surfaces that would not be harmed by pressurized cleaning liquids.

The sanitary transfer mechanism is further constructed to include guide members in the form of guide rails extending above the conveyor means on either side thereof, the guide rails serving to restrain movement of containers carried by the conveyor means in a direction transverse to the direction of conveyor movement. The guide rails, in addition to such restraining action, present non-scuff surfaces to the sides of the containers being conveyed so as to increase the safety and cleanliness of operation of the sanitary transfer mechanism. Each guide rail is preferably constructed of an elongated, rigid rail having an external surface area provided with indentations therein. A removable covering for a portion of the external surface area of the rigid rail is provided by facing means adapted to frictionally engage with the indentations in the external surface. The facing means preferably comprises an elongated strip of material such as plastic which can be frictionally secured to the rigid rail member without the use of adhesives, screw-fasteners or the like.

DESCRIPTION OF THE PREFERRED EMBODIMENTS

Objects and advantages of the instant invention other than those discussed above will become readily apparent from the following description of preferred and illustrative embodiments making reference to the annexed drawings wherein.

Figure 1:
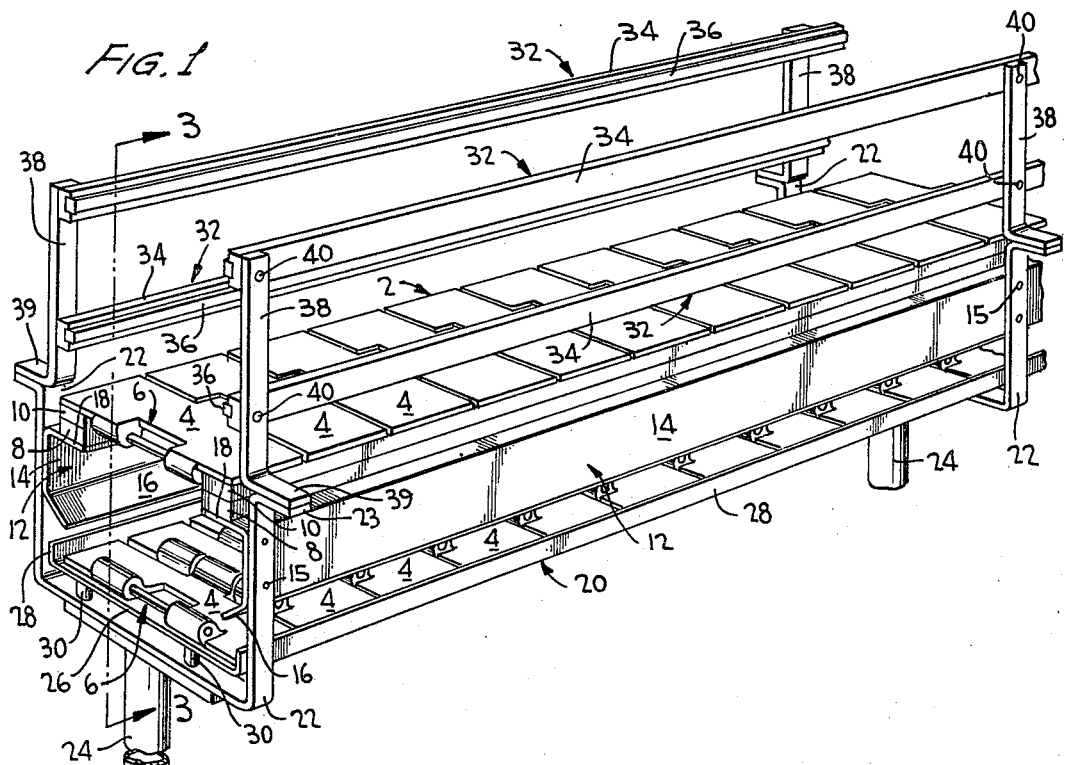
FIGURE 1 is a perspective view of a straight section of a sanitary transfer mechanism constructed in accordance with the present invention.
Figure 2:
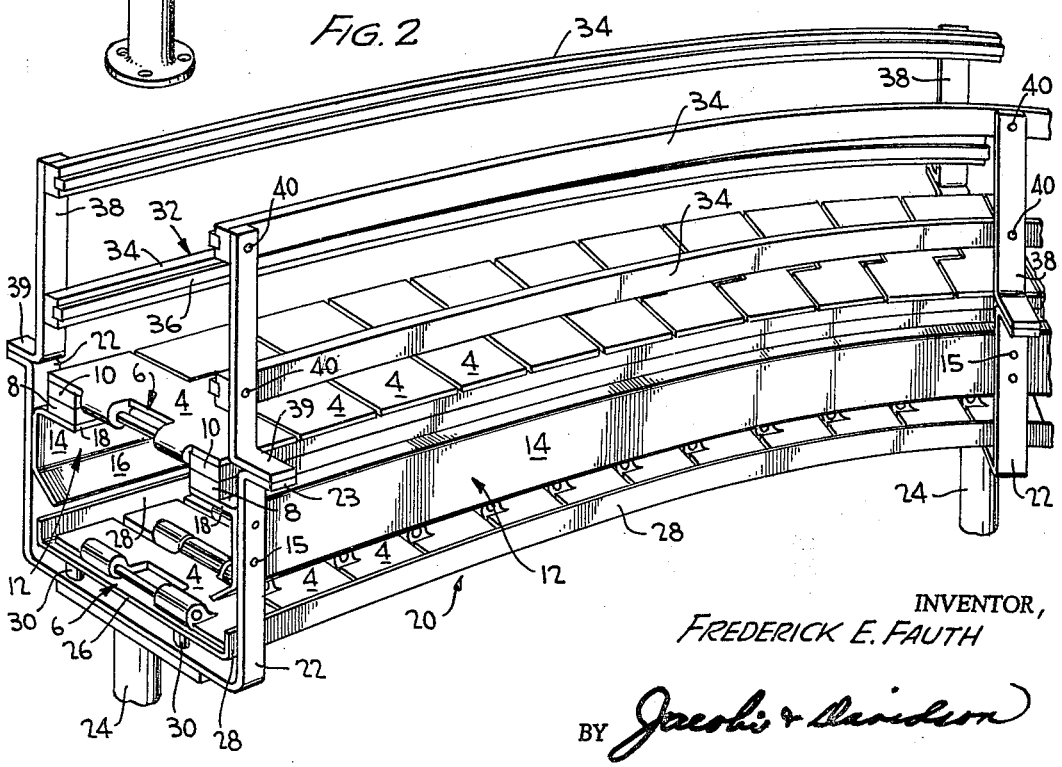
FIGURE 2 is a perspective view of a curved section of a sanitary transfer mechanism constructed in accordance with the present invention.
Figure 3:
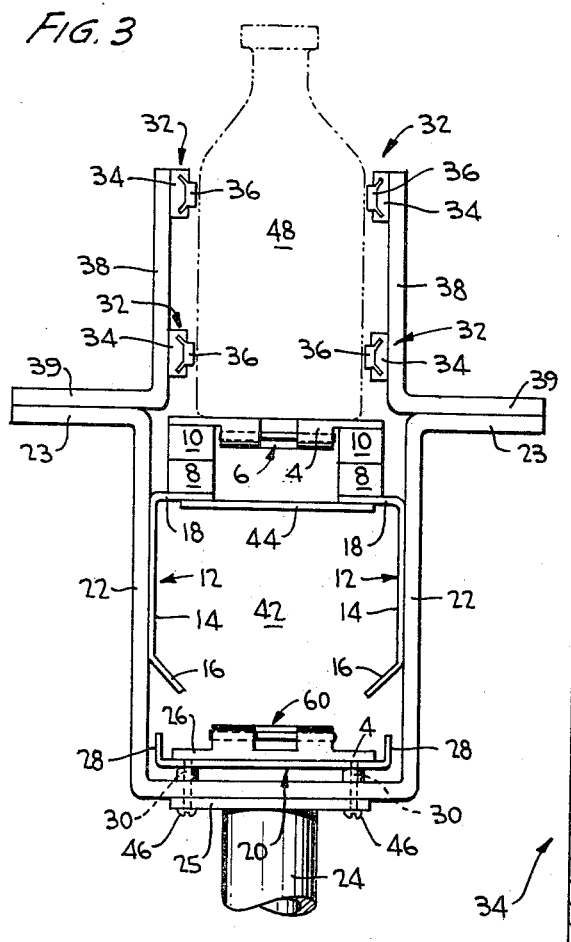
FIGURE 3 is an enlarged end elevational view of the sanitary transfer mechanism of FIGURE 1 looking in the direction of lines 3—3.

Referring now to the drawings and particularly to FIGURES 1 through 3, preferred and illustrative embodiments of sections of the inventive sanitary transfer mechanism are depicted. A straight conveyor section is shown in FIGURE 1 while a curved conveyor section is shown in FIGURE 2. A conveyor means generally designated 2 is provided for moving a container such as a bottle 48 shown in dotted lines in FIGURE 3. The conveyor means 2 preferably comprises an "endless" chain having individual links 4 hingedly connected together by a pinned hinging arrangement 6 to allow flexibility of movement although other conveyor means could also be used.

A pair of downwardly directed spaced apart confronting sidewalls 12 preferably constructed of stainless steel are disposed beneath the conveyor means 2 on either side thereof. The sidewalls 12 extend the entire length of each section of the transfer mechanism and provide, with the exposed underside of the individual chain links 4 of conveyor means 2, three sides of a hollow internal drainage and cleaning compartment 42. Each sidewall 12 has an inside surface construction tapered downwardly toward each other. Sidewalls 12 comprise generally U-shaped members having an upper leg section 18 extending inwardly in a horizontal direction, a lower leg section 16 extending inwardly in a downward direction, and an intermediate web section 14 vertically extending between both inwardly directed leg sections. The shape of sidewalls 12 provides strength for the individual sidewall members without unnecessary material thickness.

The conveyor means 2 is supported above the sidewalls 12 by a pair of spacer blocks 8 attached to the inwardly directed leg sections 18 of sidewalls 12. Spacer blocks 8 are preferably constructed of metal and include a surfacing 10 composed of phenolic compressed wood, a material which will not support bacteria growth and which will withstand conveyor cleaning processes as described below.

Disposed beneath the sidewalls 12 and in alignment with the hollow internal compartment 42 is a drainage trough member generally designated 20 having a horizontal bottom pan section 26 and raised vertical sides or legs 28. The trough member 20 provides a return path for the individual links 4 of conveyor means 2.

A generally U-shaped lower bracket 22 is provided at each end of the individual sanitary transfer mechanism sections. Supporting poles 24 having an upper surface 25 anchor the individual sections of the sanitary transfer mechanism to the floor or the like. Sidewalls 12 are attached to the lower brackets 22 by means of screws 15, while the trough member 20 is supported in a slightly raised position above the bottom of bracket 22 by means of dowels 30 and bolts 46. Periodically spaced transverse bars 44 are connected between the sidewalls 12 to provide rigidity in the conveyor construction.

The lower brackets 22 have outwardly disposed flange sections 23 at the top portions thereof, the flange sections 23 abutting with corresponding flange sections 39 of upper bracket members 38. Guide rails generally designated 32 are attached to the upper brackets 38 by means of bolts 40. Two guide rails 32 are preferably provided on each side of the sanitary transfer mechanism, one above the other, each guide rail comprising an elongated, rigid rail 34 provided with a removable facing 36. As shown in FIGURE 3, guide rails 32 prevent undesirable lateral movement of a container 48 during transport upon the conveyor means 2. The detailed configuration of the guide rails 32 will be discussed below.

The transfer mechanism constructed as discussed above provides numerous features of operation particularly useful to those industries concerned with maintaining a low bacterial count and sanitary operating conditions during transfer of containers from one point to another. As is evident, the conveyor means 2, preferably comprising individual hingedly connected chain links 4, is completely exposed to facilitate cleaning of both the top and bottom surfaces thereof. Such cleaning could be accomplished by pressure spraying with substances such as steam, hot water, or cleaning chemicals, the spray being directed into the hollow drainage and cleaning compartment 42 and also above the conveying surface of the conveyor means 2. In this manner, spill-over of contents from the transported containers 48 as well as other normal accumulations of soil and waste particles can be effectively flushed from virtually all surfaces of the transfer mechanism. Drainage for the flushed accumulations as well as for the expended cleaning solution is effected by the novel construction of sidewalls 12 in cooperation with drainage trough member 20. The expended cleaning liquids would drain down the inside surfaces of the sidewalls 12. Because of the generally tapered construction of the sidewalls 12, the expended cleaning liquids would be caused to drain into the drainage trough member 20 and thus be collected. Since the drainage trough member 20 also provides a return path for the "endless" conveyor means 2, the expended cleaning liquids will not remain within the transfer mechanism but rather will be carried out to a non-illustrated collecting point through the return motion of the conveyor means 2. In this manner, accumulation of soil and other wastes cannot take place thus greatly suppressing bacteria growth.

Figure 5:
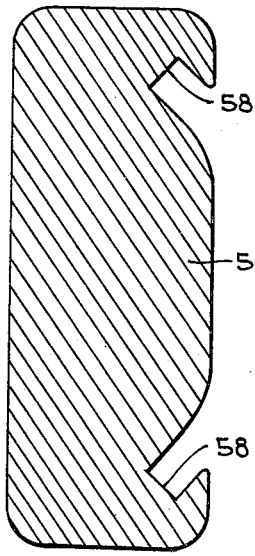
FIGURE 5 is an enlarged transverse cross-section of the rigid rail of FIGURE 4.
Figure 6:
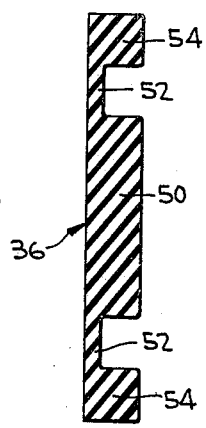
FIGURE 6 is an enlarged transverse cross-section of the facing for the guide rail of FIGURE 4.
Figure 4:
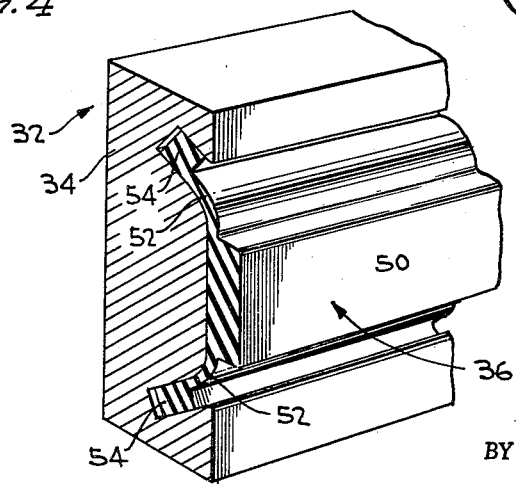
FIGURE 4 is a fragmentary enlarged perspective view of a portion of one embodiment of a guide rail comprising a rigid rail and a facing therefor constructed in accordance with the present invention.

Referring now to FIGURES 4 through 6, a preferred and illustrative embodiment of the guide rail 32 utilized with the transfer mechanism discussed above is depicted. Each guide rail 32 comprises a rectangular, elongated rigid rail 34 of extruded, polished aluminum having undercut depressions or indentations 58 in an external surface area. The external surface area can be thought of as comprising a central section 56 disposed along a longitudinal axis thereof and integral end sections disposed on either side of the longitudinal axis, the end sections containing the undercut depressions 58. The external surface area is provided with a facing or covering generally designated 36 preferably consisting of a generally rectangularly shaped plastic insert member likewise having a central section 50 disposed along a longitudinal axis thereof and integral end sections 54 disposed on either side of the longitudinal axis by a thin portion of plastic material 52. The term "plastic" as utilized herein and in the appended claims includes materials such as polyethylene, polypropylene, Teflon, Delrin, as well as rubber and the like. In practice, Delrin is preferred as the facing material due to its high strength and resiliency. The plastic insert member 36 is adapted to be removably attached to the external surface area of the rigid rail 34 by means of end sections 54 which define attaching means. End sections 54 are flexed and inserted into the undercut depressions or indentations 58 of the rigid rail 34 thereby holding the plastic insert member or facing 36 frictionally in position on the rigid rail 34. In this manner, only the plastic surface 50 can make contact with the side surfaces of a container 48 such as shown in FIGURE 3, the plastic insert member 36 presenting a non-scuff surface to the container sides which will not gouge, scratch, or otherwise damage same.

An important advantage derived from the use of the plastic insert member of facing 36 in combination with the rigid rail 34 to form a guide rail 32 resides in the fact that the facing 36 is easily replaceable. Worn sections of the facing 36 alone can be quickly removed and new sections of any length easily inserted into place. The resilient plastic construction obviates the need for adhesives and bolts in attaching the non-scuff facing surface to the guide rail, the facing being frictionally secured thereto. This construction also obviates the need for replacing the entire guide rail itself when only a portion of the protective facing is worn.

Figure 7:
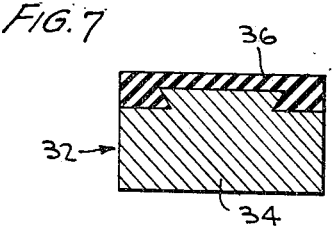
FIGURES 7–12 are enlarged transverse cross-sections of alternative embodiments of a guide rail constructed in accordance with the present invention.
Figure 8:
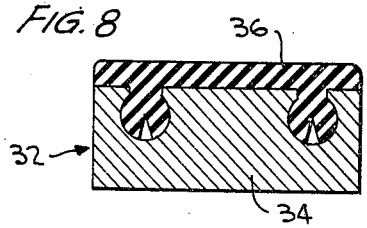
Figure 9:
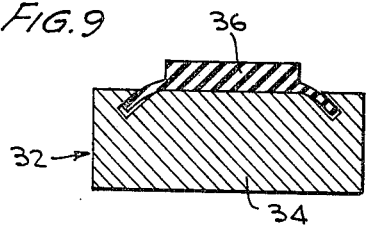

FIGURES 7 through 12 depict various other suitable embodiments of guide rails 32 constructed in accordance with the invention. Each of the suitable guide rail embodiments comprises an elongated, rigid rail 34 and a plastic insert member or facing 36. In FIGURE 7, the rigid rail 34 is shown as having a truncated central section over which a plastic insert member 36 could be resiliently attached in the manner indicated in FIGURE 13. Alternatively, the plastic insert member 36 could be slid into place on the rigid rail 34. In FIGURE 8, the rigid rail member 34 is provided with circular undercut depressions on either side of a central portion thereof, the plastic insert member 36 including circular protrusions adapted to be resiliently engaged with the circular undercut depressions to thus be removably secured therein. The arrangement depicted in FIGURE 9 utilizes the same rigid rail construction 34 of FIGURE 4. The plastic insert member of facing 36, however, has end sections of uniform reduced thickness adapted to resiliently seat in the undercut depressions of the rigid rail 34.

Figure 10:
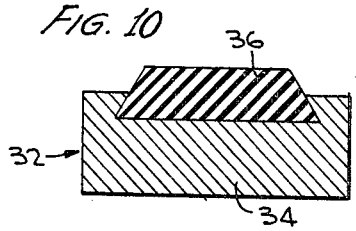
Figure 11:
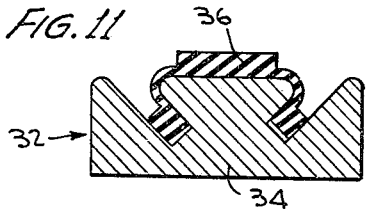
Figure 12:
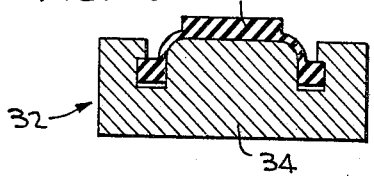
Figure 13:
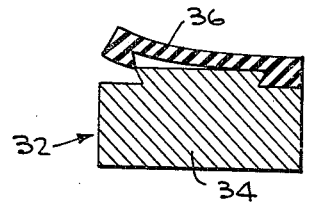
FIGURE 13 is an enlarged transverse cross-section depicting the operation of the guide rail embodiment of FIGURE 7.

The construction of the guide rail 32 depicted in FIGURE 10 makes use of a undercut depression in the rigid rail 34 having a trapezoidal shape into which a plastic insert member 36 also having a trapezoidal shape is frictionally secured. FIGURES 11 and 12 depict further modifications of the preferred guide rail embodiments of FIGURES 4 through 6. In FIGURE 11, the undercut depressions in an external surface of the rigid rail 34 proceed at an angle inwardly toward the central section of the rail 34, plastic insert member 36 being inserted into the undercut depressions and frictionally or resiliently secured in place. The rigid rail structure 34 of FIGURE 12 is provided with undercut depressions extending perpendicularly down into the external surface, the undercut depressions forming a shoulder. Plastic insert member or facing 36 is then slid into place within the undercut depressions and secured to the rigid rail 34 in a removable fashion.

Although the guide rail assemblies described herein include a plastic insert member or facing for only one side of the rigid rail, it is to be expressly understood that similar plastic insert members or facings could be provided on both sides of a guide rail so as to form an assembly which could act as a divider or deflector for conveyed containers. It is to be further understood that guide rails constructed in accordance with the instant invention could be utilized in combination with a conveyor mechanism of any design as well as with the sanitary transfer mechanism discussed above.

After reading the foregoing detailed description, it will be apparent that the objects of the invention initially set forth have been successfully achieved. Accordingly, what is claimed is:

1. A guide rail for a container conveyor mechanism, said guide rail comprising:
   an elongated, rigid rail having an external surface area provided with indentations therein; and
   facing means for providing a removable covering for at least a portion of said external surface area of said rigid rail, said facing means comprising an elongated strip having a central section disposed along a longitudinal axis thereof, attaching means disposed on either side of said central section of said elongated strip and in integral relation therewith, said attaching means being frictionally engageable with said indentations of said external surface area.

2. A guide rail according to claim 1, wherein said elongated, rigid rail is of generally rectangular shape and wherein said indentations provided in said external surface area thereof define undercut depressions.

3. A guide rail according to claim 2, wherein said undercut depressions comprise a plurality of slots extending into said external surface area at an angle therewith.

4. A guide rail according to claim 2, wherein said external surface area has a central section disposed along a longitudinal axis thereof and integral end sections disposed on either side of said longitudinal axis, said undercut depressions being formed in said integral end sections.

5. A guide rail according to claim 2, wherein said elongated, rigid rail comprises aluminum.

6. A guide rail according to claim 2, wherein said facing means is composed of plastic material.

7. A facing for at least a portion of a surface of a guide rail for a container conveyor mechanism, said guide rail defining indentations in said surface, said facing comprising:
   an elongated strip of resilient material having a central section disposed along a longitudinal axis thereof; and
   attaching means integrally carried by said central section on either side of said longitudinal axis, said attaching means being adapted to frictionally engage with said indentations in said surface of said guide rail.

8. A facing according to claim 7, wherein said resilient material is plastic.

9. A facing according to claim 8, wherein said elongated strip is of trapezoidal cross-section.

10. A facing according to claim 8, wherein said central section and said attaching means of said elongated strip are of a predetermined thickness, said attaching means being integrally connected to said central section by a portion of resilient plastic material having a thickness less than said predetermined thickness.

11. A facing according to claim 8, wherein said attaching means comprises protrusions of plastic extending from said central section on either side of said longitudinal axis thereof, said protrusions being adapted to frictionally engage with said indentations in said surface of said guide rail.

12. A sanitary transfer mechanism for transporting containers, said transfer mechanism comprising:
   conveyor means for moving said containers;

guide means comprising at least one elongated bar having a facing means frictionally engageable thereon, said guide means extending above said conveyor means on either side thereof, said guide means restraining movement of said containers in a direction transverse to the direction of conveyor movement;

a pair of spaced apart confronting side wall means disposed beneath said conveyor means on either side thereof, said pair of spaced apart confronting side wall means defining two sides of a hollow, elongated compartment beneath said conveyor means;

support means for supporting said conveyor means above said side wall means such that at least a portion of the underside of said conveyor means is exposed, said exposed underside of said conveyor means defining the top of said compartment; and trough means for providing a return path for said conveyor means, said trough means being disposed beneath said side wall means and in alignment with said compartment.

13. A sanitary transfer mechanism according to claim 12, wherein each of said pair of spaced apart confronting sidewall means provides a surface generally tapered in a downward direction toward each other.

14. A sanitary transfer mechanism according to claim 13, wherein each of said pair of sidewall means comprises a generally U-shaped member having inwardly directed leg sections and an intermediate web section extending between said leg sections, said support means being attached to one of said inwardly directed leg sections.

15. A sanitary transfer mechanism for transporting containers, said transfer mechanism comprising:

conveyor means for moving said containers;

guide means extending above said conveyor means on either side thereof, said guide means restraining movement of said containers in a direction transverse to the direction of conveyor movement;

a pair of spaced apart confronting side wall means disposed beneath said conveyor means on either side thereof, said pair of spaced apart confronting side wall means defining two sides of a hollow, elongated compartment beneath said conveyor means, each of said pair of spaced apart confronting side wall means comprising a generally U-shaped member having a surface generally tapered in a downward direction toward each other;

support means for supporting said conveyor means above said side wall means and said compartment defined thereby;

trough means for providing a return path for said conveyor means, said trough means being disposed beneath said side wall means and in alignment with said compartment; and wherein each of said pair of side wall means comprises an upper inwardly directed leg section horizontally disposed beneath a portion of said conveyor means, a lower inwardly directed leg section disposed at an angle downwardly toward said trough means, and an intermediate web section vertically disposed between said upper and lower leg sections and in general alignment with said side of said conveyor means; said support means comprising a pair of spacer members attached to said upper inwardly directed leg sections of said side wall means and providing supporting surfaces for said conveyor means.

16. A sanitary transfer mechanism according to claim 15, wherein said supporting surfaces provided by said spacer members comprises phenolic compressed wood and wherein said sidewall means are constructed of stainless steel.

17. A sanitary transfer mechanism for transporting containers, said transfer mechanism comprising:

conveyor means for moving said containers;

guide means extending above said conveyor means on either side thereof, said guide means restraining movement of said containers in a direction transverse to the direction of conveyor movement;

a pair of spaced apart confronting side wall means disposed beneath said conveyor means on either side thereof, said pair of spaced apart confronting side wall means defining a compartment beneath said conveyor means, each of said pair of spaced apart confronting side wall means providing a surface generally tapered in a downward direction toward each other;

support means for supporting said conveyor means above said side wall means and said compartment defined thereby;

trough means for providing a return path for said conveyor means, said trough means being disposed beneath said side wall means and in alignment with said compartment; and wherein said guide means extending above said conveyor means on either side thereof includes a plurality of guide rails, each guide rail comprising:

an elongated rigid rail having an external surface area provided with indentations therein; and facing means for providing a removable covering for at least a portion of said external surface area of said rigid rail, said facing means comprising an elongated strip having a central section disposed along a longitudinal axis thereof, attaching means disposed on either side of said central section of said elongated strip and in integral relation therewith, said attaching means being frictionally engageable with said indentations of said external surface area.

References Cited

UNITED STATES PATENTS

| | | | |
|---|---|---|---|
| 986,753 | 3/1911 | Plummer | 198—204 X |
| 1,977,670 | 10/1934 | Darling | 134—125 X |
| 2,156,020 | 4/1939 | Lathrop | 198—204 |
| 3,265,192 | 8/1966 | Stadelman | 198—204 |
| 3,292,772 | 12/1966 | Rice | 198—204 |

EDWARD A. SROKA, Primary Examiner

U.S. Cl. X.R.

134—125